US010562157B2

(12) United States Patent
Rinaldi

(10) Patent No.: US 10,562,157 B2
(45) Date of Patent: Feb. 18, 2020

(54) SYSTEM FOR SUPPORTING A WORKPIECE

(71) Applicant: C.M.S. S.p.A., Zogno (IT)

(72) Inventor: Nicola Rinaldi, Bergamo (IT)

(73) Assignee: C.M.S. S.p.A. (IT)

(*) Notice: Subject to any disclaimer, the term of this patent is extended or adjusted under 35 U.S.C. 154(b) by 155 days.

(21) Appl. No.: 15/328,562

(22) PCT Filed: Aug. 6, 2014

(86) PCT No.: PCT/IB2014/063743
§ 371 (c)(1),
(2) Date: Jan. 24, 2017

(87) PCT Pub. No.: WO2016/020723
PCT Pub. Date: Feb. 11, 2016

(65) Prior Publication Data
US 2017/0216998 A1 Aug. 3, 2017

(51) Int. Cl.
B23Q 1/03 (2006.01)
B25B 11/00 (2006.01)
B23Q 3/08 (2006.01)
F16M 11/14 (2006.01)
B25J 17/02 (2006.01)
B64F 5/10 (2017.01)

(52) U.S. Cl.
CPC ............ *B25B 11/005* (2013.01); *B23Q 1/035* (2013.01); *B23Q 3/088* (2013.01); *B25J 17/0266* (2013.01); *B64F 5/10* (2017.01); *F16M 11/14* (2013.01)

(58) Field of Classification Search
CPC ....... B25J 17/0266; B23Q 3/04; F16M 11/14; B64F 5/10; B25B 11/005; Y10T 292/1047; Y10T 292/1082; A61M 5/1415
See application file for complete search history.

(56) References Cited

U.S. PATENT DOCUMENTS 2,537,822 A * 1/1951 Fritts .................. H01Q 3/18
343/759
4,842,118 A * 6/1989 Puzio .................. B25J 17/0208
192/150
6,012,711 A * 1/2000 Cipolla .................. B23Q 3/186
269/20

(Continued)

FOREIGN PATENT DOCUMENTS

DE 102008049912 A1 4/2010
EP 0507033 A1 10/1992
KR 20010087774 * 4/2001

*Primary Examiner* — Monica S Carter
*Assistant Examiner* — Mahdi H Nejad
(74) *Attorney, Agent, or Firm* — Laubscher & Laubscher, P.C.

(57) ABSTRACT

A system for supporting a workpiece is disclosed, wherein several heads with a suction cup define an engaging and supporting surface that is at least partially shaped like the workpiece. Each head with suction cup is coupled by a ball joint with a first movable element of a vertical linear actuator and is couplable by a removable fitting with a fork carried by a second movable element that rotates around a rotation axis that is coaxial with the axis of the linear actuator. The second movable element carries an abutment, spaced from the center of the ball joint against which the suction cup head abuts and moved by the linear actuator to perform the adjustment of the orientation thereof around the ball joint.

19 Claims, 9 Drawing Sheets

(56) References Cited

U.S. PATENT DOCUMENTS

| | | | | |
|---|---|---|---|---|
| 6,292,998 | B1* | 9/2001 | Wiemers | B23Q 1/38 269/8 |
| 6,445,960 | B1* | 9/2002 | Borta | G09B 9/02 434/30 |
| 7,798,036 | B2* | 9/2010 | Okazaki | B25J 9/1075 74/490.05 |
| 8,430,878 | B2* | 4/2013 | Vasta | A61B 17/62 606/56 |
| 9,368,867 | B2* | 6/2016 | Evans | H01Q 3/20 |
| 9,707,448 | B2* | 7/2017 | Hockridge | A63B 26/00 |
| 10,017,277 | B2* | 7/2018 | DesJardien | B64F 5/10 |
| 2001/0019692 | A1* | 9/2001 | Ehrat | B25J 15/0616 414/735 |
| 2005/0015962 | A1* | 1/2005 | Sturm, Jr. | B23Q 1/035 29/468 |
| 2008/0204674 | A1* | 8/2008 | Imoto | G02B 7/022 353/100 |
| 2009/0057971 | A1 | 3/2009 | Bumgarner et al. | |
| 2009/0095108 | A1* | 4/2009 | Payandeh | B25J 13/02 74/480 R |
| 2012/0286123 | A1* | 11/2012 | Schwab | B23Q 1/5462 248/346.06 |
| 2013/0199284 | A1* | 8/2013 | Clusserath | G01M 17/007 73/116.01 |
| 2014/0008850 | A1* | 1/2014 | Chapman | F16F 15/022 267/140.11 |
| 2014/0353894 | A1* | 12/2014 | DesJardien | B23P 19/10 269/21 |
| 2016/0114479 | A1* | 4/2016 | Rosheim | B25J 9/0075 74/490.03 |
| 2016/0176001 | A1* | 6/2016 | Rinaldi | B23Q 3/088 269/21 |
| 2017/0221376 | A1* | 8/2017 | Gosselin | B25J 9/0072 |
| 2018/0023751 | A1* | 1/2018 | Duan | F16M 11/18 108/4 |
| 2018/0229359 | A1* | 8/2018 | Westermeier | B25J 17/0266 |

\* cited by examiner ble, on one first movable element of a linear actuator, each head being further engageable, by means of a removable fitting, with a second rotatable element that carries at least one abutment against which the head abuts that is moved by the linear actuator during an adjustment step of the orientation thereof around said coupling.

SYSTEM FOR SUPPORTING A WORKPIECE

This application is a national phase of PCT International Application No. PCT/IB2014/063743 filed Aug. 6, 2014. The entire content of this application is incorporated herein by reference.

BACKGROUND OF THE INVENTION

The invention relates to a supporting system for supporting a workpiece being machined, in particular a wide workpiece, with one dimension (thickness) that is significantly less than the other two dimensions (width and length), of non-flat shape, for example a panel of complex shape like, in particular, a double curvature panel.

Specifically but not exclusively, the system in question can be usefully used in the aerospace and/or in the automotive industry, in particular as part of a numerically controlled machining centre for machining workpieces made of different materials, for example aluminium, plastics, composite materials, etc.

In particular, reference is made to a system for supporting a workpiece in a machining position, in which the system comprises a plurality of orientable heads that are each arranged for engaging and supporting a portion of the workpiece.

Such a system is shown, for example, by patent publication US 2009/0057971. This known system comprises a plurality of linear actuators that carry suction cups that are suitable for engaging and stiffly supporting at least one workpiece in a fixed machining position. In the known system the various linear actuators are programmable so as to be suitable for use with workpieces of different shapes, making the system universal. Each suction cup can be oriented in space with at least two degrees of freedom. The suction cup is self-orientable, in an idle manner, at the moment of loading the workpiece, through the effect of the weight and the stiffness of the workpiece, and, in the case of non-perfect self-orientation, by the action of the operator.

The prior art further comprises patent publication EP 0 507 033, which shows a plant for supporting and machining workpieces, in which the plant comprises vertically movable columns, each of which carries, on the upper end, a member for fixing the workpiece.

SUMMARY OF THE INVENTION

One object of the invention is to improve the aforementioned known system that is suitable for supporting a workpiece in a preset machining position.

One advantage is to regulate the orientation of a head for gripping the workpiece within a wide range of possible orientations. In particular, the head for gripping the workpiece can be oriented around a coupling with two degrees of freedom (for example spherical), more in particular by adjusting at least one angle of elevation (for example on a vertical plane) within an angular range of about 90°, and adjusting at least one panning angle (for example on a horizontal plane) within a complete revolution of 360°.

One advantage is permitting effective gripping of a portion of workpiece that extends in a vertical or almost vertical lie.

One advantage is retaining in position a workpiece of complex shape, in particular a double curvature panel.

One advantage is orienting correctly the gripping heads for gripping the workpiece before loading the workpiece onto the supporting system.

One advantage is permitting precise and stable positioning of the workpiece, at the same time avoiding deformation or other damage to the workpiece, even in the case of workpieces of large dimensions and/or of flexible workpieces.

One advantage is providing a constructionally cheap and simple system for supporting a workpiece in a machining position.

One advantage is to make available a supporting system that is versatile and adaptable for use with workpieces of different shape.

One advantage is to provide a supporting system with several gripping heads that are orientable in space to define, in a programmable manner, engaging and supporting surfaces of the workpiece of the desired shape, even if the shape is complex.

Such objects and advantages and still others are all obtained by the supporting system according to one or more of the claims set out below.

In one example, a supporting system comprises a plurality of orientable heads that overall define at least one engaging and supporting surface that is at least partially shaped as a workpiece to be machined, in which each head is orientable, by means of a coupling with at least two degrees of freedom,

BRIEF DESCRIPTION OF THE DRAWINGS

The invention can be better understood and implemented with reference to the attached drawings that illustrate some embodiments thereof by way of non-limiting examples.

DETAILED DESCRIPTION

Figure 1:
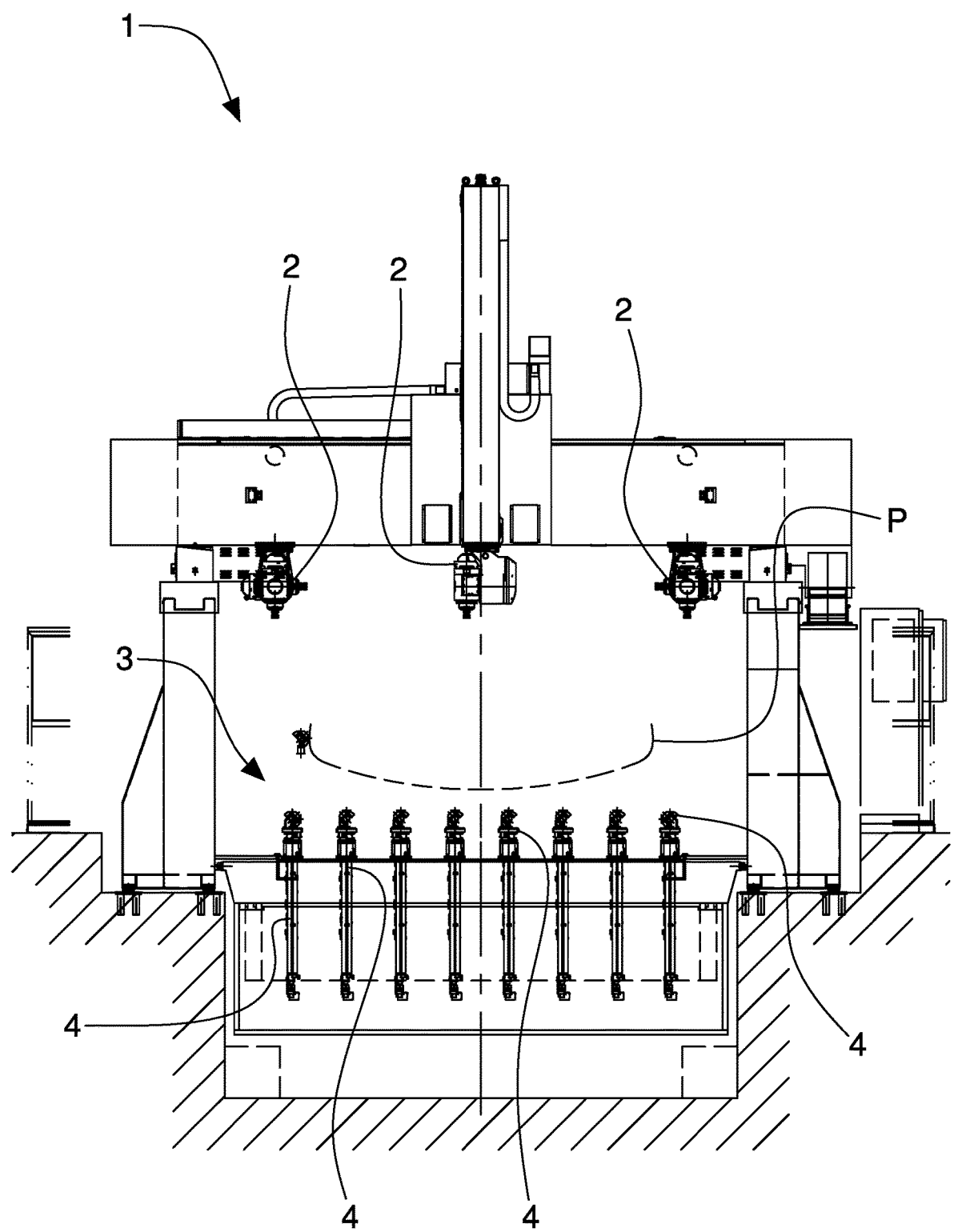
FIG. 1 shows a partially sectioned vertical elevation view, of a numerically controlled machining centre provided with a supporting system made according to the present invention.

With reference to FIG. 1, there has been indicated overall with 1 a numerically controlled machining centre for machining workpieces made of aluminium, plastics composite materials, etc. The machining centre 1 is in particular suitable for machining wide workpieces, i.e. having one dimension (thickness) that is significantly less than the other two dimensions (width and length). The machining centre 1 is suitable, for example, for machining workpieces used in the aerospace and/or in the automotive industry. The machining centre 1 is provided with one or more operating units 2 (of known type), each of which can be controlled on two or more machining axes. The machining centre 1 can be configured, for example, for cutting and/or milling and/or drilling and/or contouring and/or welding and/or still other machining tasks.

The machining centre 1 is provided with a supporting system 3 of a workpiece P being machined. The supporting system 3 disclosed here is one embodiment of the system made according to the present invention. The supporting system 3 may be particularly suitable for supporting workpieces of non-flat shape, for example panels of complex shape like, in particular, double curvature panels. In FIG. 1 there is shown with a dashed line, by way of example, a workpiece P being machined that has the shape of a curved panel.

The supporting system 3 of the workpiece P in the machining position comprises a plurality of supporting units 4. The various supporting units 4 may collaborate together to engage and support the workpiece P, overall, in a stable manner during the machining task/s. The various supporting units 4 may be arranged in an orderly manner, for example according to one or more rows (parallel to one another). FIGS. 2 to 15 relate to a single supporting unit 4 of the supporting system 3. The various supporting units 4 of the system 3 may be, in particular, the same as one another.

According to the type of supporting system 3 disclosed here, the various supporting units 4 are housed in a pit. This type is merely by way of example. Any other (known) type can be used. In particular, a supporting system may be provided with a movable bench/with movable benches or with a fixed table/fixed tables.

Each supporting unit 4 may include at least one gripping head 5 arranged for engaging and supporting a portion of the workpiece P. The head 5 may be the type with a vacuum grip, for example a head 5 with suction cup 6. The head 5 may be provided with a device for generating a vacuum in the suction cup. Such a device for generating the vacuum may be, for example, of substantially known type and accordingly it has not been disclosed in detail. Such a device for generating the vacuum may include, for example, a conduit (at least partially coaxial to the spherical joint) to connect the suction cup to a suction device (not illustrated).

Each supporting unit 4 may include at least one first actuator arranged for driving at least one first element 7 that is movable in at least a first (vertical) direction, and a fixed part 8. The first actuator may include, as in this example, a linear actuator (with a vertical axis). The first actuator may be electrically driven. The first actuator may be driven by a servomotor. The first actuator may be a (pneumatic or hydraulic cylinder) or of still another type.

Each head 5 for grasping a workpiece may be carried by the corresponding first element 7. Each head 5 may be oriented with at least two degrees of freedom with respect to the corresponding first element 7. In particular, the head 5 may be coupled with the first element 7, as in this case, with a spherical coupling around a ball joint 9 that is integral with the first element 7. The head 5 may be carried by the first element 7 and oriented with at least two degrees of freedom in an infinite number of orientation planes. In particular, the center of the ball joint 9 passes through the motion axis of the first element 7. Instead of the ball joint 9, it is possible to use another joining arrangement with two or more degrees of freedom (for example a joining arrangement including at least two rotation joints).

The head 5 of each supporting unit 4 may be moved by the corresponding first actuator with the possibility of reaching at least one machining zone (illustrated for example in FIGS. 5, 10, 14 and 15), where it can engage and support a portion of the workpiece, and at least one setting zone (illustrated for example in FIGS. 2, 3, 4, 11, 12 and 13), where the desired orientation of the head in space can be set. The machining zone may be situated, as in this case, at a greater height than the setting zone.

Each supporting unit 4 may include at least a second actuator arranged for driving at least a second element 10 that is movable in at least a second (circumferential) direction that is transverse to the first (axial) direction. The second element 10 may be rotatably coupled with the fixed part 8 of the first actuator (by interposing a rolling supporting device). The second actuator may be connected to the second element 10 by a mechanical connection (which is of the gear type in the disclosed embodiment).

The first element 7 of the first actuator may be movable linearly along a vertical motion axis. The aforesaid first direction may thus coincide with the aforesaid motion axis. The second element 10 may be rotatable around a rotation axis coinciding with the aforesaid motion axis of the first element 7. The second direction may be in this case a circumferential direction around the aforesaid rotation axis.

The second element 10 comprises, in the specific case, a disc-shaped body coaxial with the axis of the first element 7.

The second element 10 of each supporting unit 4 may be arranged, in particular, in the aforesaid (lower) setting zone. The second actuator may be arranged on the fixed part 8 of the first actuator. The second actuator includes an electric motor provided with a rotor 12.

Each supporting unit 4 may include at least a connector 13 arranged, in particular, on the second element 10 to removably connect the workpiece gripping head 5 and the second element 10, so that the head can be moved by the second actuator during the setting of the desired orientation, as will be explained better below.

The connector 13 may include, in particular, a fitting having at least one recess/protrusion associated with the second element 10 and couplable (by axial insertion parallel to the aforesaid first direction) with at least one corresponding protrusion/recess associated with the head 5. The second movable element 10 can drag with itself the head 5 in the aforesaid second (circumferential) direction when the aforesaid recess/protrusion, integral with the second element 10, is inserted into the aforesaid protrusion/recess, integral with the head 5. This insertion occurs when the head 5 is in the setting zone, i.e., the zone where orientation of the head 5 occurs.

The connector means 13 may include a fork (as more clearly visible in FIGS. 6 to 8) arranged for receiving, in a removable (insertable and extractable) fitting, one or more engaging portions of the head 5.

The head 5 may include at least one first complementary engaging portion 14 for engaging with and disengaging from the connector 13 (fork) according to an inserting and extracting direction substantially parallel to the first motion direction of the first element 7.

The head 5 may include at least one second complementary engaging portion 15 for engaging with and disengaging from the connector 13 (fork) according to an inserting and extracting direction (substantially parallel to the first motion direction of the first element 7).

As in this specific case, the first and the second engaging portion 14 and 15 are arranged on two peripheral zones of the workpiece gripping head 5.

The two aforesaid peripheral zones may be situated, in particular, in positions that are diametrically opposite one another with respect to a central zone of the head at which the head 5 is coupled with the first element 7 (in particular the central zone is the zone where the head 5 is engaged with the ball joint 9).

The connector 13 may be carried by the second element 10 and orbitally moved around the first element 7. The head 5 may be carried by the first element 7 and rotated substantially coaxial with the aforesaid orbital movement when the connector 13 connects the head 5 to the second element 10. The connector 13 may be movable on a movement plane the first element 7.

The head 5 is disengaged from the connector 13 when the head is placed by the first actuator in the aforesaid (upper) machining zone.

The head 5 may have, as in this example, a workpiece gripping zone with a gripping axis X, the workpiece gripping zone facing the portion of the workpiece to be engaged, in which the gripping axis X is arranged obliquely to an extent direction Y of the head 5 that extends joining the two aforesaid peripheral zones (having the engaging zones 14 and 15). In particular, the gripping axis X of the head may form an angle comprised between 30° and 60° (more in particular equal to about 45°) with the aforesaid extent direction Y. In particular, the gripping axis X of the head and the extent direction Y may be coplanar.

Each supporting unit 4 may include, in particular, an abutment 16 arranged on the second element 10, in particular arranged on a support 19 integral with the second element 10. This support 19 (which emerges upwards from the second element 10) may carry both the abutment 16 and the connector 13.

The abutment 16 may be situated spaced apart from a central zone of the head 5 in which the head is coupled with the first element 7 to permit orientation in space. The aforesaid central zone of the head 5 may include, in particular, the zone coupled with the ball joint 9. The abutment 16 may be arranged, as in this case, more internally than the connector 13, i.e. at a radial distance from the center of the ball joint 9 that is less than the radial distance of the connector 13.

The aforesaid first actuator moves the first element 7 downwardly to bring the head 5 into contact against at least one point of the abutment 16 and to modify the orientation of the head 5 by shifting the first element 7 downwardly, a lower surface of the head 5 remains in contact with at least one point of the abutment 16. The contact between the lower surface of the head 5 and the abutment 16 forces the head 5 to rotate around the spherical coupling, modifying the tilt thereof.

Each supporting unit 4 may include a sensor 17 for detecting when the head 5 and the second element 10 are connected together by the connector 13. This sensor 17 includes a presence or proximity sensor that detects when an engaging portion (14 or 15) of the head is inserted into the corresponding connector 13 that is integral with the second element 10. This sensor 17 may be arranged on the connector 13 and may include for example, an optical photocell type, or of electromechanical switch type, or of still another type of sensor.

The first element 7 carries the head 5 in order to orient the head 5 in a substantially idle or non-locked manner. Each supporting unit 4 includes a brake 18 associated with the respective head 5 to lock the latter in a desired orientation.

The system includes a programmable electronic control device and computer program instructions that are suitable for driving the first and second actuators.

The head 5 may be oriented in the manner disclosed below, starting, for example, with the configuration of FIG. 2 in which the gripping axis X of the head 5 is horizontal (this reference tilt is considered to be 0°) and the lying plane of the opening of the suction cup 6 is vertical.

In order to vary the orientation of the head 5, the brake 18 will be deactivate. The first engaging portion 14 is coupled with the connector 13 by being inserted into the cavity of the fork. The lower surface of the head 5 already abuts the abutment 16 (FIG. 2).

Figure 2:
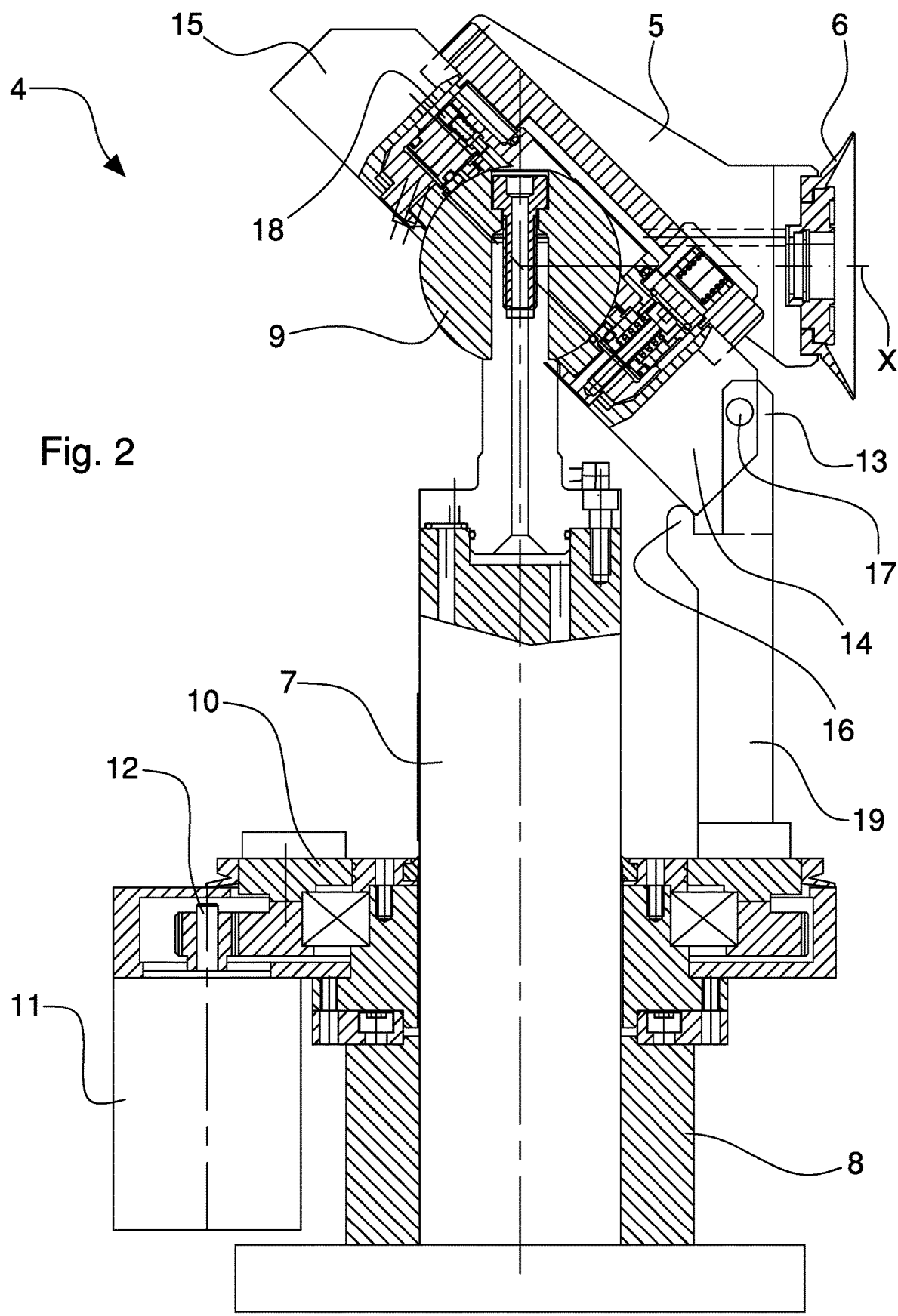
FIG. 2 is a partially sectioned vertical elevation view, of a supporting unit of the supporting system of FIG. 1.
Figure 3:
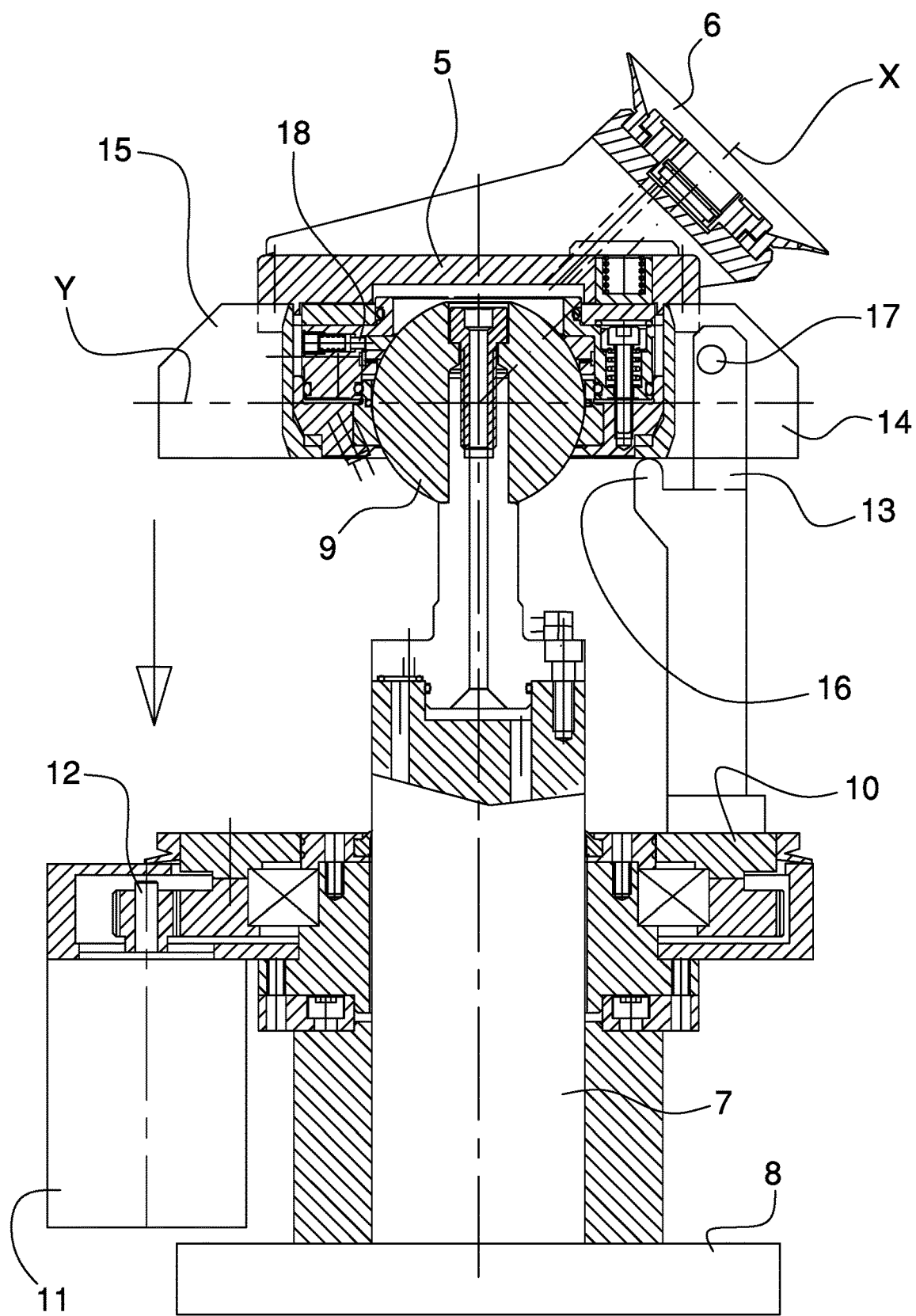
FIGS. 3 to 5 show the supporting units of FIG. 2 in three different operating configurations.

To modify the orientation of the head 5, the first movable element 7 may be lowered, for example as far as the configuration in FIG. 3, in which the gripping axis X has an oblique tilt (of about 45°). The head 5 has varied the tilt, rotating around the ball joint 9 (passing from the configuration in FIG. 2 to that in figure), through the effect of the movement performed by the first element 7 while the head 5 was in contact against the abutment 16 (FIG. 3).

It is possible to lower the first element 7 until the extent direction Y is horizontal; after which it is possible to rotate the connector 13 to define the orientation of the head 5 on a horizontal plane. The rotation of the head 5 dragged by the connector 13 enables the panning of the head 5 to be adjusted, i.e. enables horizontal adjustment (adjustment of the panning angle), permitting orientation for panning the entire horizon.

Figure 4:
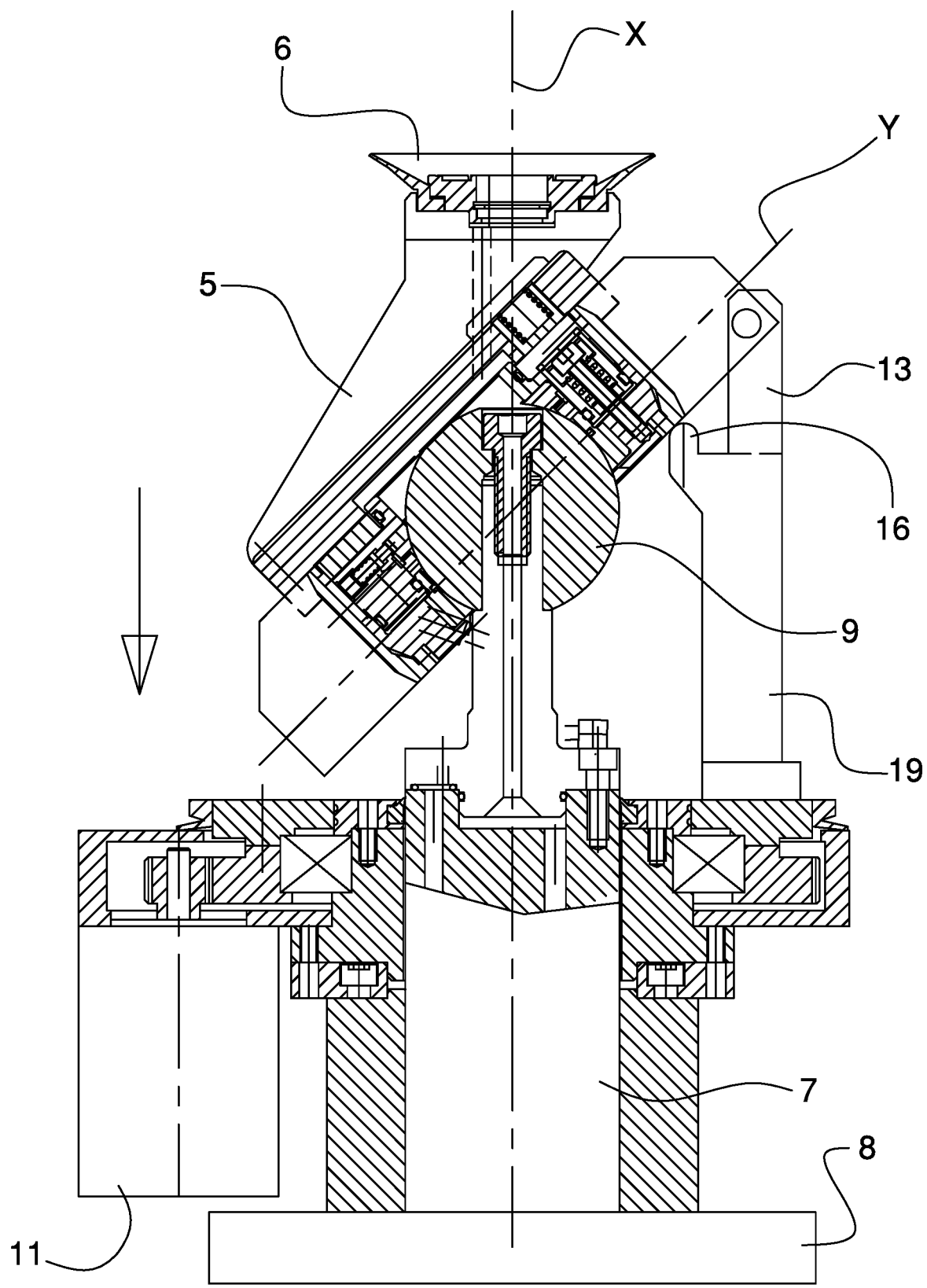

If, for example, the first movable element 7 continues to be lowered, it is possible to reach the configuration in FIG. 4, in which the gripping axis X has an almost vertical tilt (of about 90°). This further lowering of the first element 7 in fact causes thither rotation of the head 5 around the ball joint 9, the head 5 always abutting against the abutment 16 (FIG. 4).

The further lowering of the first element 7 defines, in particular, the orientation of the head 5 on a vertical plane. Thus, the rotation of the head 5 around the abutment 16 permits the elevation or rise of the head 5, i.e. the vertical adjustment (adjustment of the tilt angle), enabling the elevation orientation to be varied by about 90°.

The configurations in FIGS. 2 and 4 may, be considered, for the example disclosed here, to be the two tilt limits (minimum and maximum) that are reachable by the head 5. It is possible to stop the lowering movement of the first element 7 at a selected point, according to a preset program to obtain the desired tilt that is selectable between all the infinite possible tilts between the two tilt limits (minimum and maximum). By control of the first actuator, it is thus possible to select the tilt of the head 5 around a horizontal rotation axis (passing through the ball joint 9), in a range between 0° and 90°.

It is further possible to select the orientations of the head 5 around a vertical rotation axis (passing through the ball joint 9) in a complete range between 0° and 360°, by control of the second actuator. The head 5 can in fact be further oriented by making the connector 13 orbit around the first element 7. This orbital movement, which is implemented by the rotation movement of the second element 10, may be a complete 360° rotation. The connector 13 is configured to drag the head 5 in the orbital movement of the connecting 13 when the head is engaged in the connector.

Figure 5:
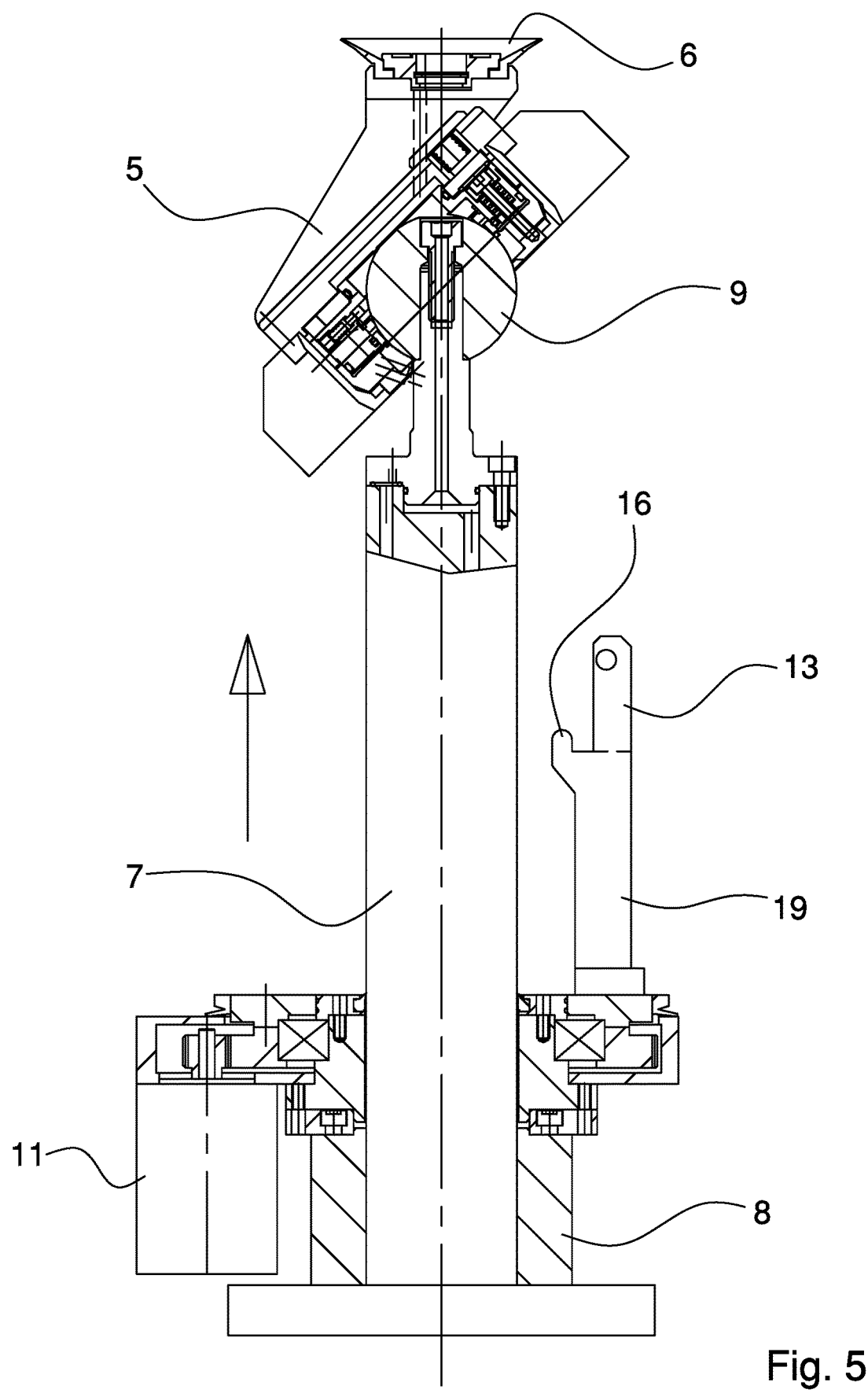
Figure 7:
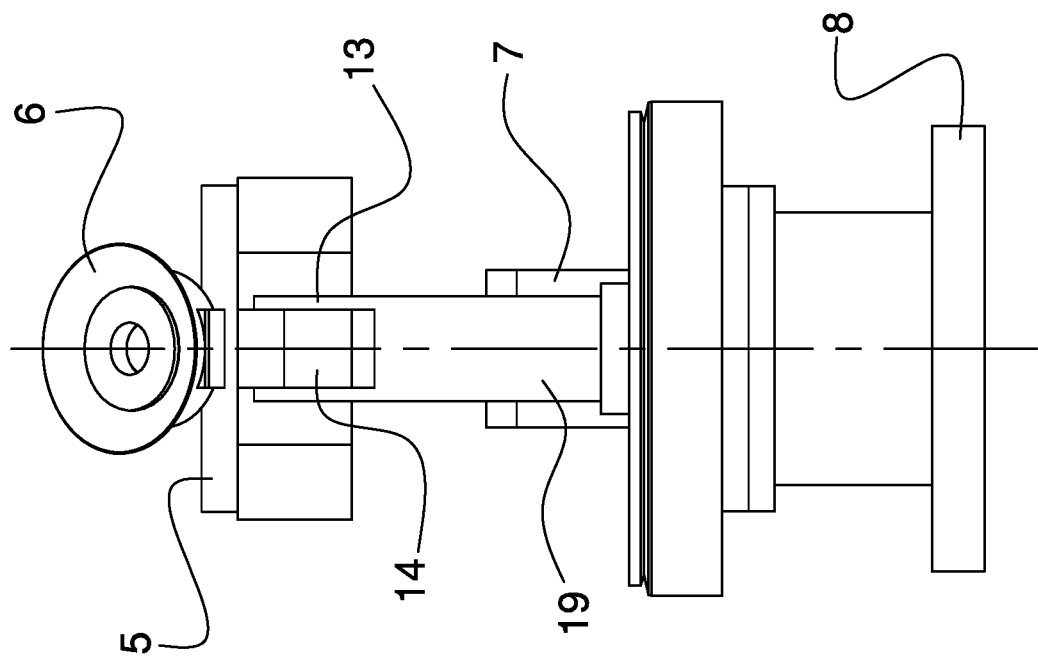
FIG. 7 is a side view from the right of FIG. 3.
Figure 6:
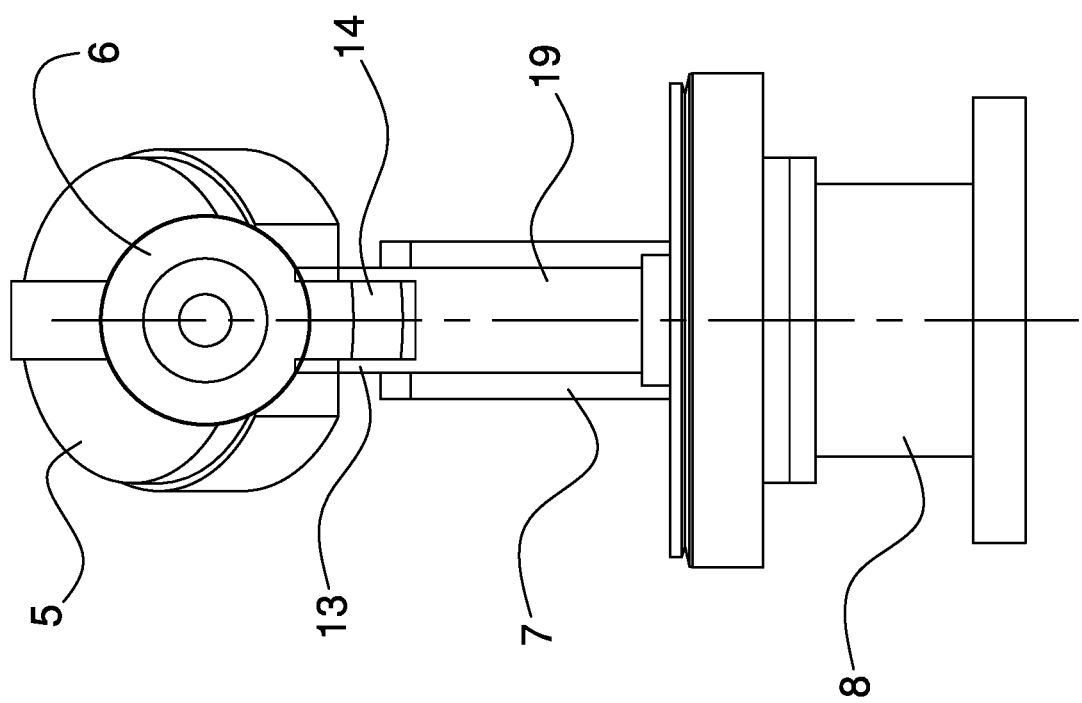
FIG. 6 is a side view from the right of FIG. 2.
Figure 8:
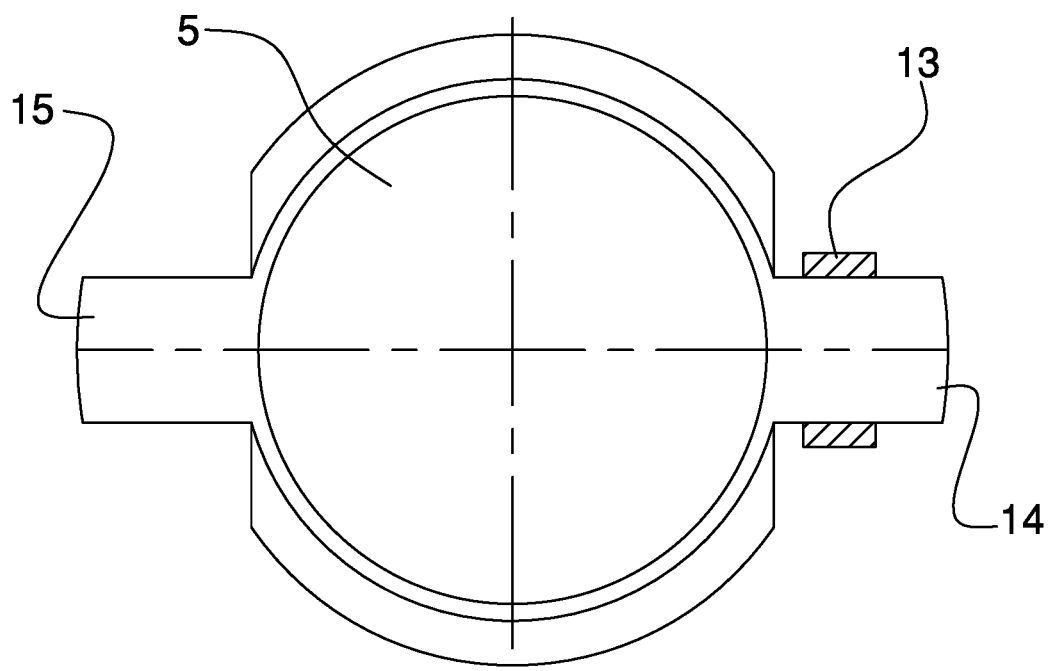
FIG. 8 is a schematic top view of FIG. 3, partially sectioned, with some parts removed to better highlight others.
Figure 9:
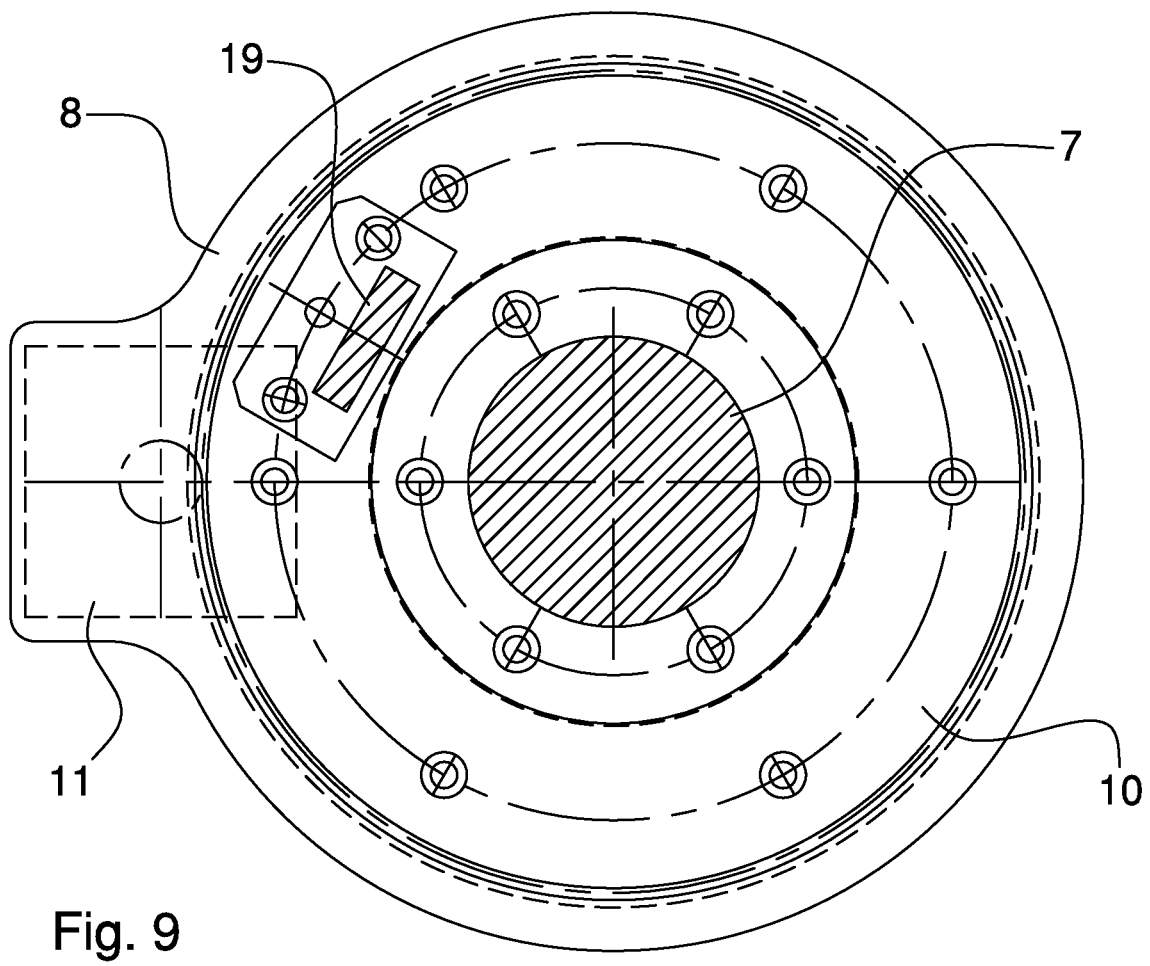
FIG. 9 is a schematic section, according to a horizontal plane, of a supporting unit of the supporting system of FIG. 1.
Figure 12:
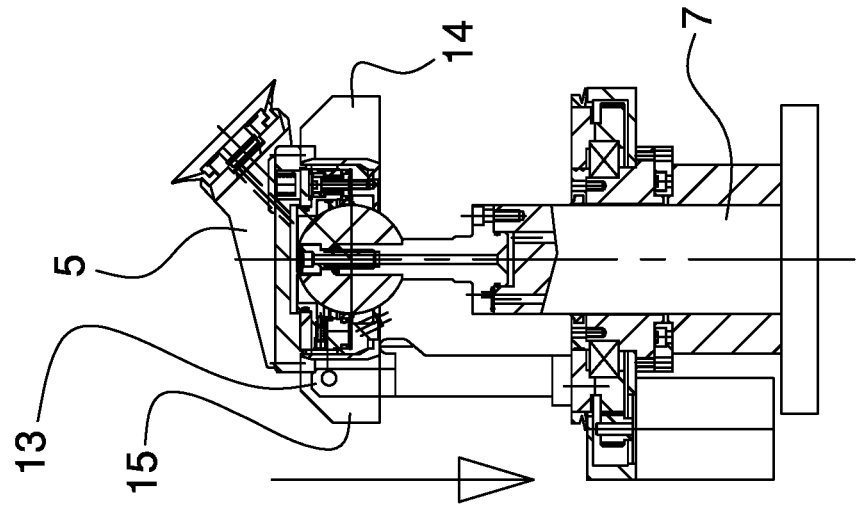
FIGS. 10 to 15 show, in a vertical elevation, the supporting unit in FIG. 2 in six different operating configurations.

Once the desired orientation of the head 5 has been reached, both around a first (horizontal) rotation axis by the first actuator, and around a second (vertical) rotation axis by the second actuator, the brake 18 is activated to lock the head 5 in position with the desired orientation, and the first element 7 is raised by the first actuator, to place the head 5 in the machining position (FIG. 5).

In order to perform another adjusting step of the orientation of the head 5, starting from the configuration in FIG. 5, for example to adapt to another workpiece of different shape to be machined, it is possible to perform the tasks disclosed below, with reference to FIGS. 10 to 15.

Figure 10:
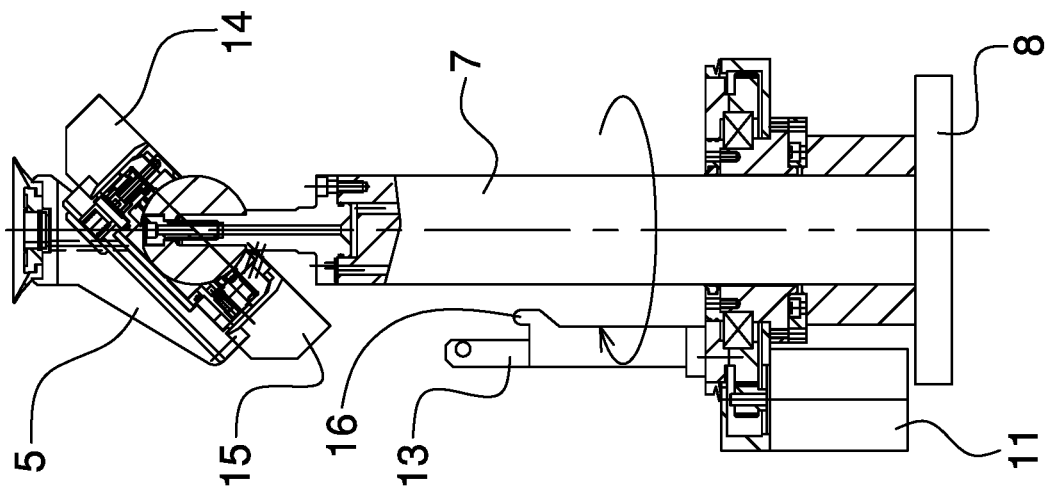

The second actuator shifts the second element 10 such that the connecting connector 13 is aligned on the engaging portion arranged below, which in this case is the second portion 15 (FIG. 10).

Figure 11:
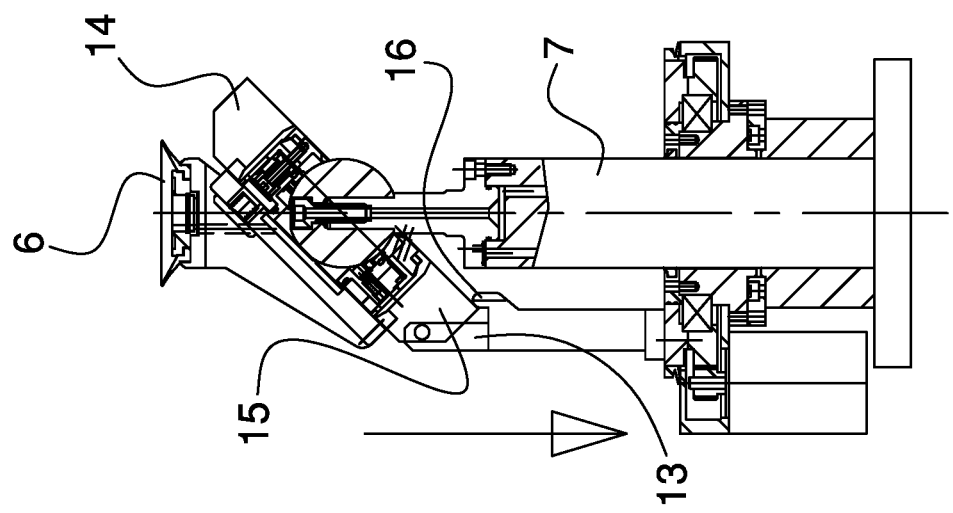

Afterwards, the first actuator lowers the first element 7 so that the second engaging portion 15 engages the first connector 13 and the head 5 abuts the abutment 16 (FIG. 11).

Figure 13:
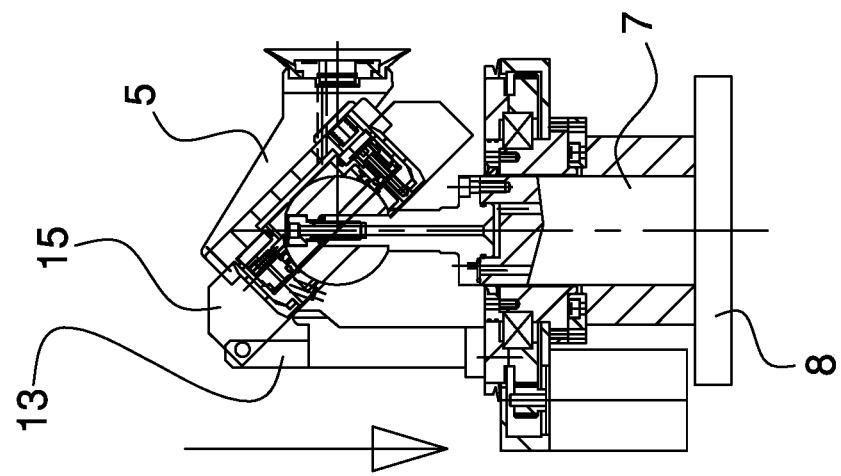

The first element 7 may continue to descend, such that the tilt of the head 5 is modified (FIG. 12), until, if necessary, the limit configuration (FIG. 13). The tilt of the axis X may be selected also in this case in the range between 0° and 90°. The angular position of the head 5 around the vertical axis may be adjusted in the range that includes an entire orbital revolution (between 0° and 360°) through the effect of dragging by the second rotatable element 10.

Figure 14:
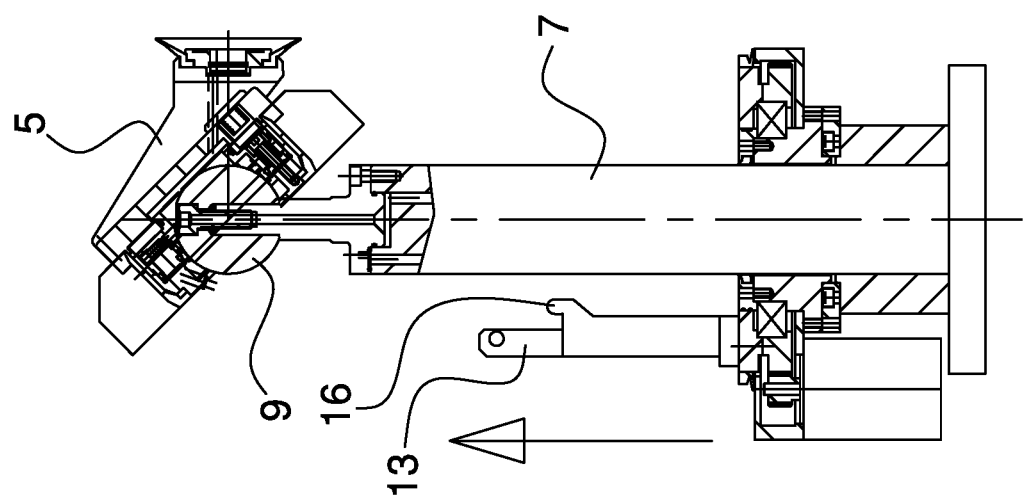

Once the desired orientation of the head 5 around the two rotation axes has been reached, the brake 18 is locked and the first actuator can lift the head 5 to the work position at the desired height (FIG. 14).

Figure 15:
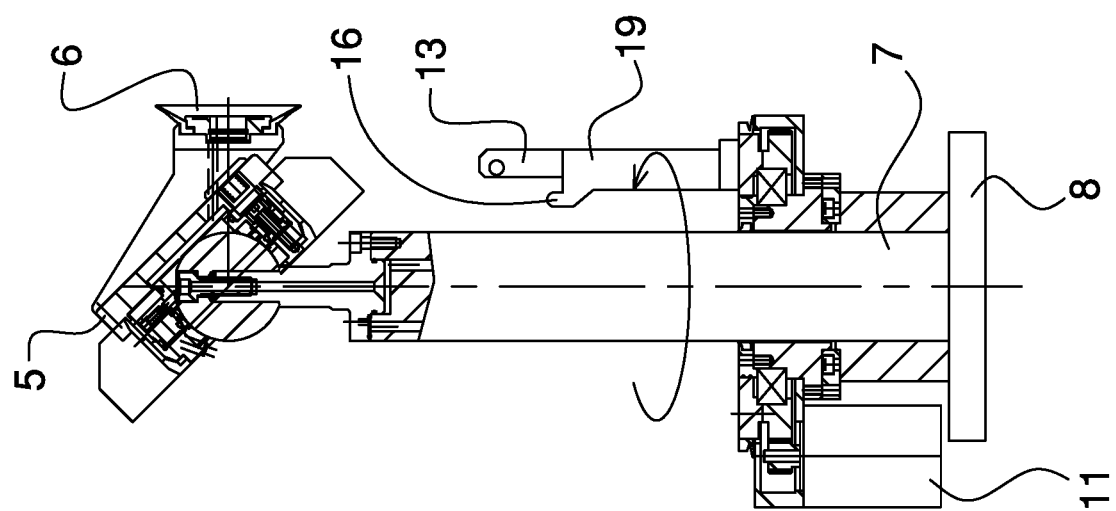

It is possible to return to the initial position in FIG. 2, by driving the second actuator to shift the second element 10 such that the connector 13 is aligned on the engaging portion arranged below, which in this case is the first portion 14 (FIG. 15). It is thus possible to perform a new setting cycle for setting the desired orientation of the head 5.

It is possible to first adjust the panning angle (horizontal orientation of the panning angle) and then adjust the angle of elevation or rise (vertical orientation of the tilt angle).

The adjustment of the panning angle and the elevation angle, which defines the position of the head 5 according to two degrees of freedom, occurs in the setting zone. The subsequent positioning (lifting) of the movable element 7 in the machining zone defines a third degree of freedom.

In the specific case disclosed above the connector 13 includes a fork fitting, although it is possible to use different connecting arrangements, for example of the magnetic attraction type, or a motor-driven hooking device, or a clutch device, etc.

In the specific case, the head 5 is oriented around a spherical coupling, although other types of kinematic couplings with a least two degrees of freedom could be used.

In one example, coupling the engaging portions 14 and 15 with the connector 13 may occur when the extent direction Y is horizontal, to have the engaging portion 14 or 15 arranged so as to offer a larger region to be inserted into the seat of the connector 13.

The invention claimed is:

1. A system for supporting a workpiece in a machining position, comprising a plurality of supporting units, each supporting unit comprising:
    a head arranged for engaging and supporting a portion of the workpiece;
    a first actuator for driving at least one first element that is movable in at least one first direction, said head being carried by said at least one first element for orientation in space, said head being moved to reach at least one machining zone in which the head engages and supports the portion of the workpiece and at least one setting zone wherein a desired orientation of the head in space is set;
    a second actuator, said second actuator comprising a rotatable actuator for driving at least one second element that is movable in at least one second direction that is transverse to said at least one first direction, said second element being arranged in said setting zone;
    a connector arranged on said second element to removably connect said head and said at least one second element such that said head can be moved by said second actuator during setting of the desired orientation;
    an abutting device arranged on said at least one second element, said first actuator being configured to move said at least one first element to bring said head into contact with said abutting device and modifying the orientation of said head through movement of said at least one first element while said head is in contact with said abutting device;
    said second actuator comprising a rotary motor;
    said at least one first element being linearly movable relative to a motion axis, said at least one first direction coinciding with said motion axis;
    said at least one second element being rotatable around a rotation axis coinciding with said motion axis of said at least one first element, said at least one second direction being a circumferential direction around said rotation axis;
    said at least one second element carrying said head to orient said head in an idle manner;
    each supporting unit further comprising a brake connected with said head to lock said head in a desired orientation;
    said at least one machining zone being arranged at a greater height than said at least one setting zone;
    said abutting device being arranged at a radial distance from a central zone of said head in which said head is coupled with said at least one first element to permit orientation in space;
    said head being disengaged from said connector when said head is placed by said first actuator in said at least one machining zone.

2. The system according to claim 1, wherein said head comprises at least one first engaging portion configured to engage with and disengage from said connector according to an inserting and extracting direction parallel to said at least one first direction.

3. The system according to claim 2, wherein said head comprises at least one second engaging portion configured to engage with and disengage from said connector according to an inserting and extracting direction parallel to said at least one first direction.

4. The system according to claim 3, wherein said at least one first and second engaging portions are arranged on two peripheral zones of said head.

5. The system according to claim 4, wherein said two peripheral zones are diametrically opposite one another compared with a central zone of said head at which said head is coupled with said at least one first element.

6. The system according to claim 4, wherein said head has a gripping zone that faces the portion of the workpiece and has a gripping axis arranged obliquely to an extent direction of said head that extends between said two peripheral zones.

7. The system according to claim 6, wherein said gripping axis forms an angle between 30° and 60° with, said extent direction.

8. The system according to claim 1, wherein said central zone includes a ball joint.

9. The system according to claim 1, wherein said connector comprises a fork arranged for receiving at least one of a first engaging portion and a second engaging portion of said head.

10. The system according to claim 1, and further comprising a sensor to detect when said head and said at least one second element are connected together by said connector; said sensor being arranged on said connector.

11. The system according to claim 1, wherein the movements in said at least one first direction and in said at least one second direction adjust, respectively, an elevation angle and a panning angle of said head.

12. The system according to claim 1, wherein said at least one first element is linearly movable according to the motion axis, said head being carried by said at least one first element with an orientation in space according to at least two rotation axes, at least one of which coincides with said motion axis of said at least one first element.

13. The system according to claim 1, wherein said first actuator comprises a linear actuator and said second actuator comprises a rotor of said rotary motor.

14. The system according to claim 1, wherein said connector is carried by said at least one second element and orbits around said at least one first element, said head being carried by said at least one first element and movable in an orbit when said connector connects said head to said at least one second element, said connector being movable on a movement plane that is perpendicular to a linear movement axis of said at least one first element.

15. The system according to claim 1, wherein said second element carries said head via a coupling having two degrees of spherical freedom.

16. The system according to claim 1, wherein said head is of the type with a vacuum grip.

17. The system according to claim 1, wherein said connector comprises a fitting having at least one recess or protrusion associated with said at least one second element and couplable by axial insertion parallel to said at least one first direction with at least one corresponding protrusion or recess associated with said head, whereby said at least one second element can drag said head in said second direction when said recess or protrusion is inserted into said protrusion or recess, respectively.

18. A method for using the system according to claim 1, comprising the steps of:
    driving said first actuator to engage said head with said at least one second element in said at least one setting zone;
    driving at least one of said first actuator and said second actuator to move said head to set the desired orientation wherein movement in said at least one first direction adjusts an elevation angle of said head and movement in said at least one second direction adjusts a panning angle of said head; and
    driving said first actuator to disengage said head from said at least one second element and move said head to said at least one machining zone.

19. A system for supporting a workpiece in a machining position, comprising a plurality of supporting units, each supporting unit comprising:
    a head arranged for engaging and supporting a portion of the workpiece;
    a first actuator for driving at least one first element that is movable in at least one first direction, said head being carried by said at least one first element for orientation in space, said head being moved to reach at least one machining zone in which the head engages and supports the portion of the workpiece and at least one setting zone wherein a desired orientation of the head in space is set;
    a second actuator independent of said first actuator, said second actuator comprising a rotatable actuator for driving at least one second element that is movable in at least one second direction that is transverse to said at least one first direction, said second element being arranged in said setting zone and configured to remain in said setting zone when said head is placed in said machining zone;
    a connector arranged on said second element to removably connect said head and said at least one second element such that said head can be moved by said second actuator during setting of the desired orientation;
    an abutting device arranged on said at least one second element, said first actuator being configured to move said at least one first element to bring said head into contact with said abutting device and modifying the orientation of said head through movement of said at least one first element while said head is in contact with said abutting device;
    said second actuator comprising a rotary motor;
    said at least one first element being linearly movable relative to a motion axis, said at least one first direction coinciding with said motion axis;
    said at least one second element being rotatable around a rotation axis coinciding with said motion axis of said at least one first element, said at least one second direction being a circumferential direction around said rotation axis;
    said at least one second element carrying said head to orient said head in an idle manner;
    each supporting unit further comprising a brake connected with said head to lock said head in a desired orientation;
    said at least one machining zone being arranged at a greater height than said at least one setting zone;
    said abutting device being arranged at a radial distance from a central zone of said head in which said head is coupled with said at least one first element to permit orientation in space;
    said head being disengaged from said connector and out of contact with said abutting device when said head is placed by said first actuator in said at least one machining zone.

* * * * *